United States Patent [19]

Lisfeld

[11] 4,136,927
[45] Jan. 30, 1979

[54] UNIVERSAL MICROSCOPE CONDENSER
[75] Inventor: Robert Lisfeld, Ulmtal, Ulm, Fed. Rep. of Germany
[73] Assignee: Ernst Leitz Wetzlar GmbH, Wetzlar, Fed. Rep. of Germany
[21] Appl. No.: 806,699
[22] Filed: Jun. 15, 1977
[30] Foreign Application Priority Data
Jun. 16, 1976 [DE] Fed. Rep. of Germany ....... 2626864
[51] Int. Cl.$^2$ .............................................. G02B 21/08
[52] U.S. Cl. ......................................... 350/87; 350/38; 350/17
[58] Field of Search ....................... 350/87, 88, 89, 38, 350/17, 256, 257, 245, 247, 315, 318

[56] References Cited
U.S. PATENT DOCUMENTS
3,799,645  3/1974  Stankewitz .............................. 350/87

Primary Examiner—Jon W. Henry
Attorney, Agent, or Firm—Richard L. Schwaab

[57] ABSTRACT

A universal microscope condenser includes a supporting member having a fixed lens mounted thereon. A pivot arm is pivoted to the supporting member and a first lens member mounted on the pivot arm for movement by the pivot arm into optical alignment with the fixed lens. The supporting member also includes a carrier slide which has a second lens member mounted thereon. The first and second lens members can be switched in and out of optical alignment with the fixed lens to vary the aperture and luminous field of the universal microscope condenser. Also included is a variable aperture stop disposed between the first and second lens members. Preferably, the first lens member moves along an arcuate path which intersects the optical axis of the fixed lens and the second lens member moves along a path which is tangent to the arcuate path of the first lens member when the first lens member is aligned with the optical axis of the fixed lens.

16 Claims, 3 Drawing Figures

UNIVERSAL MICROSCOPE CONDENSER

BACKGROUND OF THE INVENTION

This invention relates to a universal microscope condenser having a fixed lens member, two lens members that can alternately be switched on and off to vary the aperture and luminous field, and a variable aperture stop in the space between the switchable lenses.

This type of condenser is exemplified in German Offenlegungsschrift No. 2,116,625 in which the switchable lens members are connected via a common bevel gear and in which the lens members move in parallel planes after rectification.

SUMMARY OF THE INVENTION

A principal object of the invention is to provide a new and improved changing mechanism for switchable lens members to permit a compact design for a universal condenser for microscopes and, in particular, to also allow insertion in the space between the switchable lens members of additional components for influencing light beams.

In view of the foregoing object, and other objects, the instant invention contemplates a universal microscope condenser having a supporting member with a fixed lens mounted thereon and a pivot arm pivoted to the supporting member. A first lens member is mounted on the pivot arm for movement by the pivot arm into optical alignment with the fixed lens. A carrier slide is also mounted on the support member and a second lens member mounted on the carrier slide. The first and second lens member can be moved in and out of optical alignment with the fixed lens to vary the aperture and luminous field of the universal microscope condenser. A variable aperture stop is disposed between the first and second lens members.

The instant invention also contemplates that the first lens member moves along an arcuate path which intersects the optical axis of the fixed lens, and that the second lens member moves along a path which is tangent to the arcuate path of the first lens member, when the first lens member is aligned with the optical axis of the fixed lens.

DESCRIPTION OF THE PREFERRED EMBODIMENT

Figure 1:
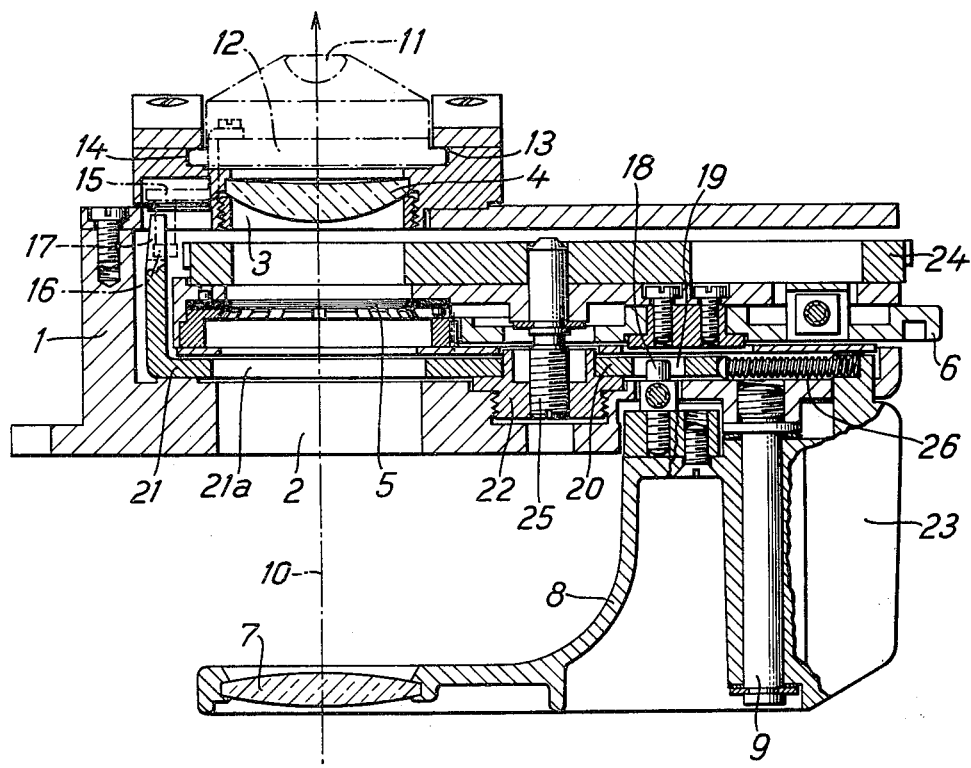
FIG. 1 is a side elevational view of a universal microscope condenser constructed in accordance with the principles of the invention.
Figure 2:
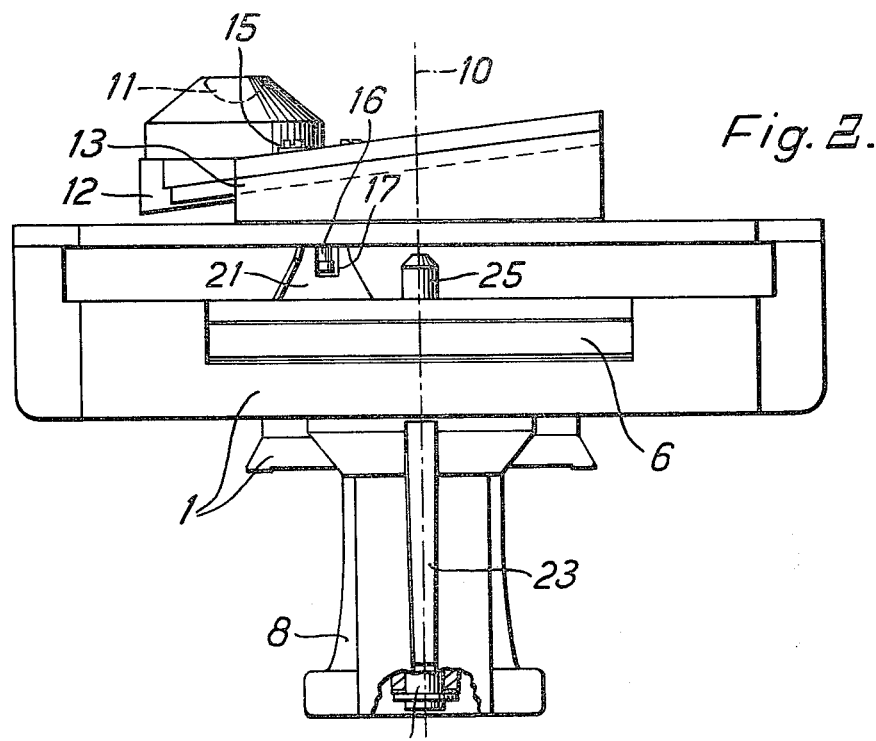
FIG. 2 is a side view of the universal microscope condenser, partially in section, taken normal to the view of FIG. 1.
Figure 3:
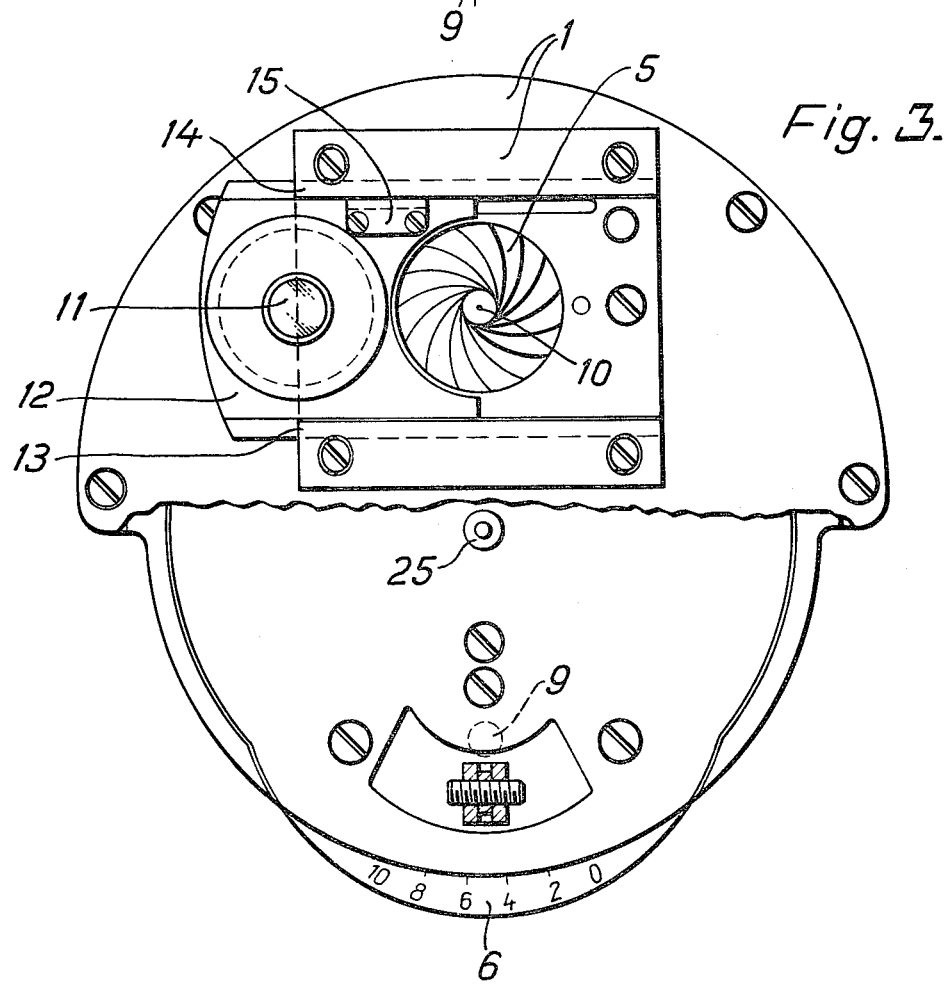
FIG. 3 is a top view of the universal microscope condenser of FIG. 1.

In accordance with the teachings of the invention, the first lens member switchable in the line of direction or sight is attached to a pivot arm. The second switchable lens member is attached to a carrier slide and the pivot arm and carrier slide are mounted on a common support with the carrier slide moving in a direction tangential to the swivel radius of the pivot arm.

The pivot arm and the carrier slide may be connected together by a two-arm lever having an axis of rotation which is aligned parallel to the optical axis of the condenser. The two-arm lever is also mounted on the supporting body. The axes of rotation of the pivot arm and of the lever, and the optical axis of the condenser and fixed lens are primarily in one plane with the axis of rotation of the pivot arm lying on the same side as that of the lever when viewed from the optical axis. Furthermore, the pivot arm and the carrier slide are each coupled to different arms of the lever.

Advantageously, the pivot arm and the carrier slide are operatively connected in the axial direction on opposite sides with the associated lever arms. Furthermore, the axis of rotation of the pivot arm may be separated a greater distance from the optical axis of the condenser than the axis of rotation of the lever. Conveniently, the pivot arm in the region between its axis of rotation and that of the lever is coupled to the lever and, hence, the carrier slide is coupled to the lever arm pointing to the optical axis. Further advantages are achieved if the coupling between the carrier slide and the associated pivot arm is effected on the side of the optical axis of the condenser facing away from the axis of rotation, the pivot arm being so constructed that it does not alter the optical path of a beam in any of its positions. Separate slotted pin guides may be provided as coupling elements between the pivot arm and the lever and between the carrier slide and the lever.

In a further development of the invention, a tab is mounted on the pivot arm to serve as a handle, the tab being secured to the axle of rotation of the pivot arm. The slide guide may be inclined toward the optical axis in such a way that a lens member passed therethrough also moves vertically during the operation from the switch-on to the switch-off position. In addition, the axis of rotation of the lever may be constructed as a hollow axle with a stud movable in the axial direction inserted into the hollow axle. The stud may serve as the axis of rotation of a turret plate which is insertable in the condenser and is preferably interchangeable.

The drawing shows a section through a universal condenser that may be attached to a microscope, for example, via a dovetail guide (not shown). The condenser includes a U-shaped supporting body 1 having an arm with top and bottom apertures 2 and 3 respectively, for the passage of light. A fixed lens member 4 is inserted in the top opening 3. In supporting body 1, there is placed in the beam's path a variable aperture stop 5, the opening of which may be varied by means of lever 6. A first switchable lens member 7 is attached to pivot arm 8. An axle 9 forms an axis of rotation for the pivot arm 8 and is aligned parallel to the optical axis 10 of the lens member 7 and the condenser. The axle 9 is inserted from the bottom into supporting body 1.

A second switchable lens member 11 forms the condenser head and is mounted on carrier slide 12 above fixed lens member 4. Carrier slide 12 is slidably mounted in slide guides 13 and 14 on top of supporting body 1. The direction of travel of carrier slide 12 is normal to the plane of the drawing in a direction tangential to the swiveling motion of pivot arm 8. The slide guides 13 and 14 extend normal to the plane of the drawing rising rearwardly. In other words, the slide guides 13 and 14 define a sloping path so that the carrier slide 12 carries the second lens member 11 along a path which has a vertical component, or rather, a component extending in the same direction as the optical axis. Thus, when switched on, the condenser head can travel to an aperture in the microscope stage (or specimen support or mount, not shown) and, thus, be close to the specimen plane.

An elbow 15 is attached to carrier slide 12 with pin 16 projecting downwardly and engaging a fork 17. Likewise, pivot arm 8 has a pin 18 extending into supporting body 1 and meshing with rectangular slot 19. Coupling elements 16, 17 and 18, 19 function as slotted pin guides.

The connection between pivot arm 8 and carrier slide 12 is formed by a two-arm lever with lever arms 20, 21. A fulcrum member 22 of the lever is constructed as a hollow axle and is aligned parallel to optical axis 10 of the condenser. It is mounted on the base of supporting body 1 in the interior thereof. Optical axis 10 and the axles 9, 25 are preferably in one plane but may also be in different planes. Lever 20, 21 has an aperture 21a in the region of the optical path of a light beam. Here the lever may also be bifurcated so that the optical path of a beam is not cut by any of the positions of lever 20, 21.

Pin 18 of pivot arm 8 is geared in the region between axles 25 and 9 from the bottom with lever arms 20. Pivot arm 21 is turned up and is in operative connection with pin 16. Tab 23 forms a handle on pivot arm 8, by means of which lens member 7 is swung into, or out of, the path of a light beam. Its motion is transmitted to lever 20, 21, causing carrier slide 12 to move in the opposite direction. The particular operating position of lever 20, 21 is fixed by means of a spring pressed detent 26.

The arrangement of the transmission elements in accordance with the teachings of the invention permits a relatively flat construction of supporting body 1.

The U-shaped supporting body 1 remains open from one side, so that still further components can be inserted in the illuminating path of a beam.

It is of particular advantage to place the components influencing the illuminating beams on a turret plate 24, which is inserted in supporting body 1. For easy centering of the turret plate 24, a stud 25 is inserted through hollow axle 22 to mount the turret plate.

The term "universal condenser" is appropriate, because its switchable lens members permit a variety of luminous field and apertures. Furthermore, it can be adapted to a very wide range of illuminating applications by inserting variously equipped turret plates.

What is claimed is:
1. A universal microscope condenser comprising:
 a supporting member;
 a fixed lens mounted on the supporting member to provide a fixed optical axis;
 a pivot arm pivoted to said supporting member about an axis parallel to the optical axis;
 a first movable lens member mounted on said pivot arm for movement by said pivot arm into optical alignment with said fixed lens, said first lens member thereby being movable in a plane perpendicular to the optical axis;
 a carrier slide mounted movably on said supporting member for movement in a plane generally aligned with the optical axis;
 a second movable lens member mounted on said carrier slide;
 means acting upon said pivot arm and said carrier slide for moving said first and second lens members into and out of optical alignment with the fixed lens to vary the aperture and luminous field of the microscope condenser; and
 a variable aperture stop disposed between the first and second movable lens members.

2. The universal microscope condenser of claim 1, wherein the first lens member moves along an arcuate path which intersects the optical axis of the fixed lens and the second lens member moves along a path, the projection line of which onto the plane of movement of the first movable lens member is tangent to the arcuate path of the first lens member when the first lens member is aligned with the optical axis of the fixed lens.

3. The universal microscope condenser of claim 2 further including a lever mounted on the supporting member, having two arms and an axis of rotation parallel to the optical axis of the fixed lens, said lever connecting the pivot arm and carrier slide.

4. The universal microscope condenser of claim 3, wherein the lever and pivot arm have axes of rotation which are parallel with and lie in substantially the same plane as the optical axis.

5. The universal microscope condenser of claim 4 wherein the axes of the lever and pivot arm are adjacent to one another with the axis of the lever being between the axis of the pivot arm and optical axis.

6. The universal microscope condenser of claim 5 wherein the lever is bifurcated to form two lever arms having connections wherein the pivot arm is attached by one connection to one arm of the lever and the carrier slide is attached by another connection to the other arm of the lever.

7. The universal microscope condenser of claim 6 wherein the connections for the pivot arm and carrier slide are on opposite sides of the lever arms.

8. The universal microscope condenser of claim 7 wherein the axis of rotation of the pivot arm is separated from the optical axis by a greater distance than the axis of rotation of the lever.

9. The universal microscope condenser of claim 8, wherein the pivot arm is coupled to the lever intermediate the axis of rotation of the pivot arm and the axis of rotation of the lever, and the carrier slide is coupled to the lever arm which extends from the axis of rotation of the lever toward the optical axis.

10. The universal microscope condenser of claim 9 wherein the coupling between the carrier slide and the pivot arm is effected on the side of the optical axis of the fixed lens facing away from the axis of rotation of the lever arm and wherein the pivot arm is constructed so as not to alter the optical path of a beam focused therethrough in any of its positions.

11. The universal microscope condenser of claim 10 wherein couplings between the pivot arm and lever and carrier slide and lever are effected by pin-in-slot connections.

12. The universal microscope condenser of claim 2 wherein a tab projects from the pivot arm and serves as a handle for rotating the pivot arm.

13. The universal microscope condenser of claim 4, further comprising a turret plate rotatably mounted between said first and second lens members, and wherein the lever is mounted on a hollow axle containing a stud which serves as a mounting means and axle of rotation for said turret plate.

14. The universal microscope condenser of claim 13, wherein said stud is axially movable within said hollow axle, whereby the turret plate is rendered readily replaceable.

15. The universal microscope condenser of claim 1 further including: a sloping guide means for slidably mounting the carrier slide so that the second lens mounted thereon follows a path having a component extending in the direction of the optical axis as the carrier slide is slid in the guide means.

16. The universal microscope condenser of claim 2 further including: a sloping guide means for slidably mounting the carrier slide so that the path of the second lens mounted thereon has a component extending in the direction of the optical axis as the carrier slide is slid in the guide means.

* * * * *